United States Patent [19]

Imai et al.

[11] 3,772,471

[45] Nov. 13, 1973

[54] ERASING HEAD FOR USE WITH MULTI-TRACK MAGNETIC TAPE

[75] Inventors: Tsutomu Imai, Tokyo; Zenkichi Nakamura, Miyagi-ken, both of Japan

[73] Assignee: Sony Corporation, Tokyo, Japan

[22] Filed: May 17, 1971

[21] Appl. No.: 143,873

[30] Foreign Application Priority Data

May 21, 1970 Japan .............................. 45/43436

[52] U.S. Cl. .......................... 179/100.2 D, 29/603

[51] Int. Cl. ......................... G11b 5/14, G11b 5/22

[58] Field of Search ............. 179/100.2 E, 100.2 D, 179/100.2 MD, 100.2 Z

[56] References Cited

UNITED STATES PATENTS

| | | | |
|---|---|---|---|
| 2,784,259 | 3/1957 | Camras | 179/100.2 D |
| 3,478,340 | 11/1969 | Schwartz et al. | 179/100.2 C |
| 2,594,934 | 4/1952 | Kornei | 179/100.2 D |
| 3,373,250 | 3/1968 | Adams | 179/100.2 D |
| 3,107,279 | 10/1963 | Hanes et al. | 179/100.2 Z |

FOREIGN PATENTS OR APPLICATIONS

| | | | |
|---|---|---|---|
| 1,180,541 | 10/1964 | Germany | 179/100.2 D |

*Primary Examiner*—Bernard Konick
*Assistant Examiner*—Robert S. Tupper
*Attorney*—Lewis H. Eslinger, Alvin Sinderbrand and Curtis, Morris & Safford

[57] ABSTRACT

A magnetic head for erasing signals in a track that occupies only a portion of the width of a magnetic tape has a plurality of ferrite layers united, as by sintering, and being respectively magnetized and non-magnetic. Edge surfaces of the layers combine to define a surface of the head for contact with the tape, with such edge surfaces extending parallel to the direction of relative travel of the head and tape and with the edge surface of the magnetized ferrite layer having a width equivalent to that of the tape track from which signals are to be used. In addition to having a low coercive force, the non-magnetic ferrite preferably has a very high magnetic permeability for absorbing flux from the magnetized layer and preventing erasing of signals from regions of the tape adjacent the track contacted by the magnetized layer.

5 Claims, 9 Drawing Figures

INVENTORS
TSUTOMU IMAI
ZENKICHI NAKAMURA
BY Lewis H. Eslinger
ATTORNEY

INVENTORS
TSUTOMU IMAI
ZENKICHI NAKAMURA
BY Lewis H. Eslinger
ATTORNEY

ERASING HEAD FOR USE WITH MULTI-TRACK MAGNETIC TAPE

This invention relates generally to a magnetic head for erasing signals recorded on a magnetic medium, and more particularly is directed to a magnetic erasing head especially suited for use with magnetic tape.

A magnetic erasing head has been proposed in which a permanent magnet is utilized as the source of the erasing magnetic field, and this type of erasing head is referred to as a direct-current erasing head. Further, it has been proposed to provide such a direct-current erasing head with a permanent magnetization which presents a series or succession of alternately opposed poles at locations along the contact surface of the head to be engaged with the magnetic tape, and in which the strength of the mangetization at the successive poles decreases progressively in the direction of relative movement of the tape with respect to the head.

An erasing head which is permanently magnetized in the manner last referred to above provides substantially the same erasing effect on the tape as a so-called alternating current erasing head, but is apparently less costly than the latter by reason of its avoidance of the need to provide an alternating current power source, as required by an alternating current erasing head. Direct-current erasing heads of the described type are preferably formed of a ferrite, such as, barium-ferrite or strontium-ferrite, because such substances have a high magnetic coercive force, and therefore can be permanently magnetized, and further because the mentioned substances have great hardness and strength so as to strongly resist wearing away due to the frictional contact with the magnetic tape.

However, if signals are recorded in a plurality of tracks on a magnetic medium, for example, a magnetic tape, the previously proposed erasing heads are not suitable for erasing the signals in only a selected one or more of the recording tracks. When only the signals in a specified track or tracks of the tape are to be erased, the contact surface of the erasing head should be magnetized in only a limited portion of the width thereof which corresponds to the track or tracks from which the signals are to be erased, whereas the remainder of the contact surface should be non-magnetized and should act only as a guiding surface of the tape. However, if the head is formed completely of a magnetic material, it is extremely difficult to magnetize only a restricted portion of the head, and it is inevitable that the remaining portion of the head will be magnetized at least to a small extent. This small extent of magnetization in portions of the head which do not correspond with the track or tracks from which signals are to be erased inevitably leads to partial erasing or at least deterioration of the signals which are intended to be undisturbed by the erasing head. Signals of small wavelength are particularly susceptible to being easily erased by the low levels of magnetization that are inadvertently present in portions of the head that are not aligned with the track or tracks from which signals are intended to be erased. The foregoing problems are particularly acute in cassette-type tape recorders in which the recording tracks and/or the spaces between such tracks on the magnetic tape are of relatively small width.

If it is attempted to avoid the described inadvertent erasing of signals from the tape by providing an erasing head having a width, at its contact surface, that is only equal to the width of the track from which signals are to be erased, the fact that the contact surface of such an erasing head has a width substantially smaller than that of the overall width of the tape will prevent the smooth running of the tape over the contact surface of the erasing head.

Accordingly, it is an object of this invention to provide a magnetic head that is particularly suited for erasing signals in a selected track or tracks occupying only a portion of the width of a magnetic tape.

Another object is to provide a magnetic erasing head that avoids the inadvertent erasing of signals other than those intended to be erased, and ensures the smooth running of the tape over the erasing head.

A further object is to provide an erasing head, as aforesaid, which is formed entirely of ferrites so as to present a contact surface that uniformly and strongly resists wear resulting from the frictional engagement of the tape therewith.

In accordance with an aspect of this invention, a magnetic erasing head is made up of a plurality of ferrite layers which are united, as by sintering, and respectively magnetized and non-magnetic, such layers having exposed edge surfaces combining to define the contact surface of the head, with the exposed end surfaces extending generally parallel to the direction of relative movement of the tape across the contact surface and each constituting only a part of the width of the contact surface.

In a preferred embodiment of the invention, each of the non-magnetic layers of the erasing head is of a ferrite, for example, zinc-ferrite, manganese-ferrite, or manganese-zinc-ferrite, having a low magnetic coercive force and a high magnetic permeability for absorbing leakage flux from each adjacent magnetized layer, whereas each magnetized layer is of a ferrite, such as, barium-ferrite or strontium-ferrite, having a very high magnetic coercive force so as to be readily permanently magnetized.

The above, and other objects, features and advantages of this invention, will be apparent in the following detailed description of illustrative embodiments thereof which is to be read in connection with the accompanying drawings, wherein.

Figures 1, 2, 4:
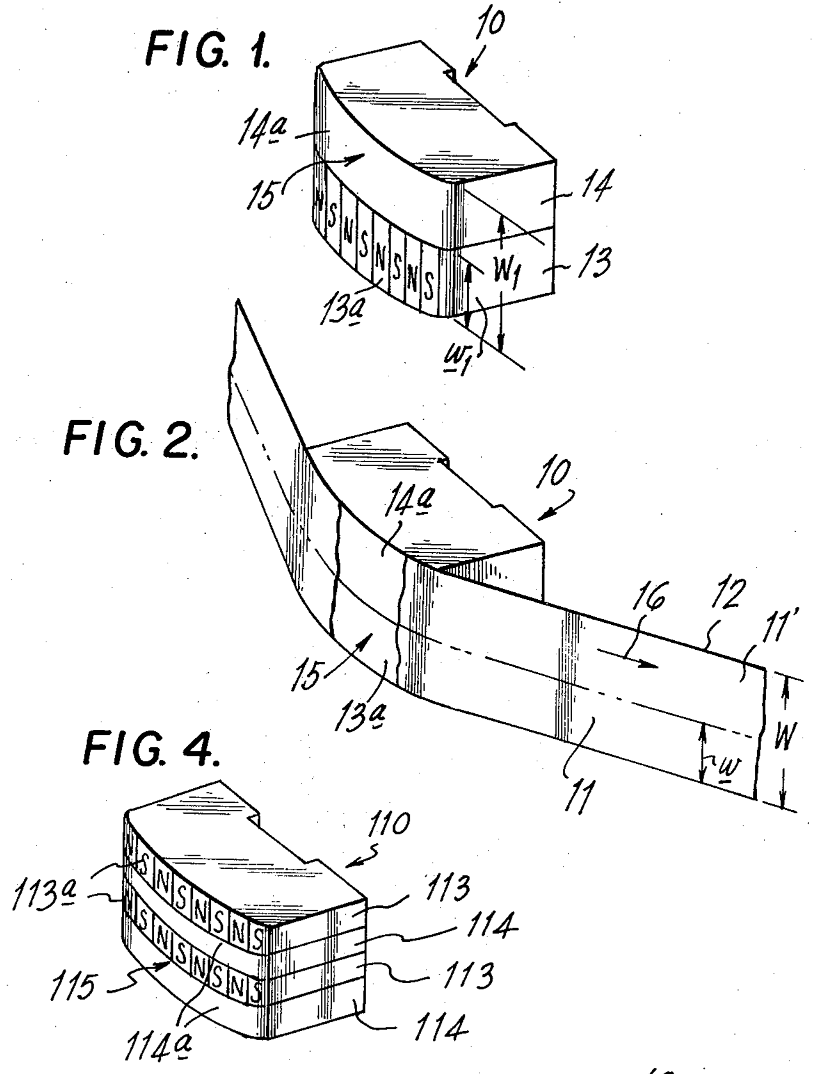
FIG. 1 is a perspective view showing an erasing head according to one embodiment of this invention.
FIG. 2 is a view similar to that of FIG. 1, but showing the relationship of the erasing head to a magnetic tape from which signals are to be erased.
FIG. 4 is a view similar to that of FIG. 1, but showing a head according to another embodiment of this invention.

Referring to the drawings in detail, and initially to FIGS. 1 and 2 thereof, it will be seen that the magnetic erasing head 10 according to an embodiment of this invention, as there shown, is intended to erase signals that are recorded in a track 11 (FIG. 2) extending along a magnetic tape 12 and having a width $w$ that is only about one-half the overall width W of the tape. In order to erase signals only from such track 11, and to leave undisturbed signals recorded in a track 11' occupying the remainder of tape 12, the head 10 according to this invention comprises two united or integral ferrite layers 13 and 14 which are respectively magnetized and non-magnetic and which have exposed edge surfaces 13*a* and 14*a* combining to define the contact surface 15 of the head across which the tape 12 is relatively movable.

The tape 12 is moved longitudinally relative to erasing head 10 in the direction of the arrow 16 on FIG. 2, and it will be seen that exposed edge surfaces 13*a* and 14*a* which combine to form the contact surface 15 extend generally parallel to the direction of such relative movement and each constitute only a part of the width of the contact surface considered transverse to the direction of the relative movement. The overall width $W_1$ of head 10 at its contact surface 15 is at least as large as the width W of the tape 12 so that the latter will be smoothly guided and supported by the contact surface during the relative movement of the tape and head, and the width $w_1$ of the exposed edge surface 13*a* of mangetized layer 13 is approximately equal to the width *w* of the track 11 on the tape from which signals are to be erased.

The ferrite of which the magnetized layer 13 is formed is selected so as to have a high magnetic coercive force and thus be capable of being permanently magnetized. Preferably, the magnetized layer 13 is formed of barium-ferrite or strontium-ferrite which have a magnetic coercive force of approximately 1650 Oersted and a relatively low magnetic permeability of approximately 1.5. On the other hand, the ferrite layer 14 is selected to have a very low magnetic coercive force, and preferably also a very high magnetic permeability. The low coercive force of the ferrite selected for the layer 14 ensures that such layer will not be magnetized during magnetization of the layer 13, and the high magnetic permeability of the ferrite selected for the layer 14 ensures that the later will not only act as a guide for the tape 12 but will also act as a magnetic flux absorber. Thus, leakage magnetic flux from the magnetized layer 13 will be absorbed by the layer 14 and will not penetrate the tape 12 at the track 11' thereof when signals are to be erased only in the track 11. Accordingly, the high magnetic permeability of the ferrite of layer 14 ensures that the magnetized layer 13 will effect erasure of signals only from the track 11 which corresponds both in position and width to the magnetized layer 13. The ferrite for forming the non-magnetic layer 14 is preferably selected from zinc-ferrite, manganese-ferrite or manganese-zinc-ferrite. By way of example, it may be noted that manganese-ferrite has a coercive force of 4 Oersteds and a high magnetic permeability of 250, while manganese-zinc-ferrite has a coercive force of 0.2 Oersteds and a still higher magnetic permeability of approximately 1,500 to 2,500.

Since all of the layers 13 and 14 constituting the erasing head 10 are formed of ferrites, the entire contact surface 15 constituted by exposed edge surfaces of the ferrite layers has a substantially uniformly high strength and resistance to wear while desirably restricting the erasing action to the width of the magnetic tape 12 that corresponds to the width of the magnetized layer 13.

Figure 3:
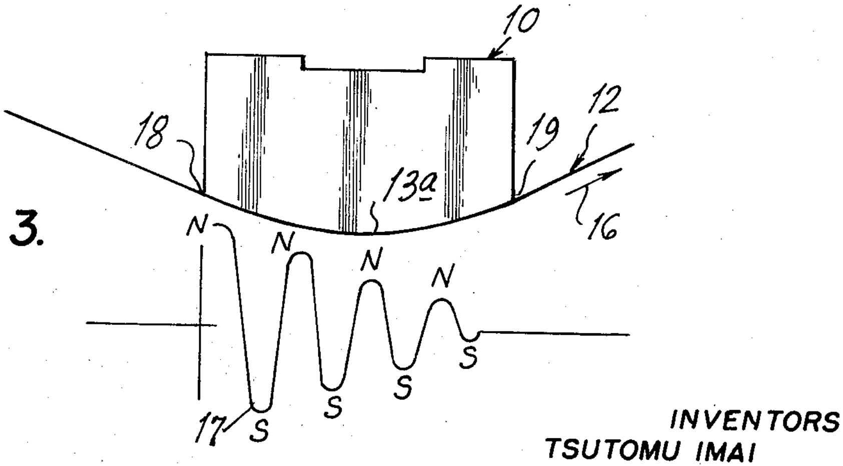
FIG. 3 is a diagrammatic plan view of the head and tape appearing on FIG. 2, and graphically showing the arrangement of the magnetization of a portion of the erasing head.

As indicated schematically on FIG. 1 and graphically at 17 on FIG. 3, the layer 13 of a ferrite having a high magnetic coercive force is magnetized so that its edge surface 13*a* presents a series or succession of alternately arranged opposed poles at locations along such edge surface, with the strength of the magnetization decreasing progressively along such series of poles in the direction of relative movement of the tape 12. Thus, the magnetization has a maximum strength at the end 18 of surface 13*a* first encountered by the track 11 on tape 12 and decreases to zero at the other end 19 of edge surface 13*a*. Accordingly, as the tape 12 is moved relative to head 10 in the direction 16, the signals recorded in the track 11 of the tape will be erased by a magnetic field which alternates and is of decreasing strength, so that the erasing action will be similar to that achieved with an alternating current erasing head. Although the head 10 has been described as erasing only the signals recorded in the track 11 of tape 12, it is apparent that inverting of either the head 10 or the tape 12 to bring the edge surface 13*a* of magnetized layer 13 into alignment with the other track 11' of the tape will then make it possible for the head to erase only signals recorded in the track 11' while leaving undisturbed the signals recorded in the first mentioned track 11. Thus, the head 10 is obviously adapted for the selective erasing of magnetic signals recorded in one or the other of the two tracks 11 and 11' on tape 12.

Of course, it will be apparent that a magnetic erasing head according to this invention may be provided for selectively erasing signals recorded in more than one track of a magnetic tape. For example, as shown on FIG. 4, a magnetic erasing head 110 according to this invention may comprise two magnetized ferrite layers 113 and two non-magnetic ferrite layers 114 which are superposed and united, as by sintering, in an alternating arrangement with the exposed edge surfaces 113*a* of the magnetized layers and the exposed edge surfaces 114*a* of the non-magnetic layers combining to define the contact surface 115 of the head across which the magnetic tape is relatively movable. With the head 110, which is similar to the head 10 apart from the number of its ferrite layers, the magnetized layers 113 are effective to selectively erase signals from two correspondingly located tracks of a magnetic tape while the non-magnetic layers 114 of the head ensure that the signals in other correspondingly located tracks of the tape will not be disturbed or partially erased.

In manufacturing a magnetic erasing head according to this invention, for example, the head 10 described above with reference to FIGS. 1 and 2, respective ferrite powders A and B are prepared initially for the magnetic and non-magnetic layers 13 and 14, whereupon such powders are formed into the respective layers which are united to each other by hot-pressing or sintering.

The powder A for forming each magnetic layer 13 may be produced by mixing powdered $BaCO_3$ powder and powdered $Fe_2O_3$, approximately in the proportion of 20:80 (mo 1.%), such mixing preferably taking place in a ball mill with the addition of water thereto. After thorough mixing of the $BaCO_3$ and $Fe_2O_3$ powders, the resulting mixture is dried and then initially fired at a temperature in the range between approximately 600° and 1,000° C, whereupon the frit thus formed is crushed and ground to a fine powder which is in turn mixed with a binder, such as, for example, polyvinyl alcohol, to provide the powder A from which each magnetic layer 13 will be formed.

The powder B for producing each non-magnetic layer 14 is formed by mixing powdered ZnO and powdered $Fe_2O_3$, in the proportion of approximately 50:50 (mol.%), with the addition thereto of $Al_2O_3$, in an amount which is approximately 3 wt.% based on the entire weight of the mixture, for the purpose of controlling shrinkage. The mixture is thoroughly agitated and mixed with water in a ball mill, and is then dried, initially fired and crushed or ground to a fine powder which is mixed with a binder to provide with powder B for forming the layer 14, in a manner similar to that described above for forming the powder A of layer 13.

Referring now to FIGS. 5A–5E, it will be seen that a magnetic erasing head 10 according to this invention is molded in a press 20 comprising a mold 21 formed with a cavity 22 opening at the top and bottom of mold 21, and vertically movable plungers 23 and 24 which are adapted to enter the cavity or recess 22 at the top and bottom, respectively, thereof. The mold cavity 22 is shaped so as to correspond to the desired configuration of the finished erasing head, and the plungers 23 and 24 are similarly shaped to fit closely within the mold cavity.

Figure 5A:
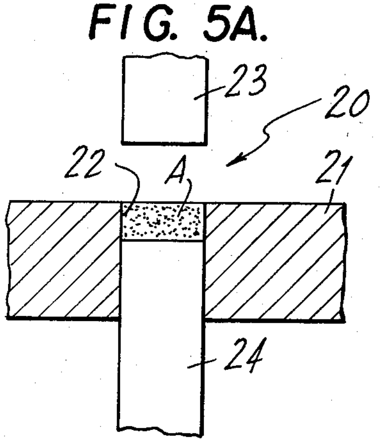
FIGS. 5A–5E are schematic sectional views illustrating successive stages in the manufacture of an erasing head by a method according to this invention.

As shown on FIG. 5A, a suitable quantity of the powder A is introduced into cavity 22 with the bottom surface of such cavity being constituted by the upper end of the plunger 24 inserting therein. Then, the powder A is initially pressed between plungers 23 and 24 (FIG. 5B), for example, at a pressure of approximately 200 $kg/cm^2$. The resulting pressed layer 13' and the plunger 24 thereunder are lowered within cavity 22 and a suitable quantity of the powder B is introduced into cavity 22 above layer 13' (FIG. 5C). The powder B superposed on the pressed layer 13' is then pressed together with the latter between plungers 23 and 24 (FIG. 5D), for example, at a pressure of approximately 1,000 $kg/cm^2$. The resulting body 10' (FIG. 5E) comprised of the pressed layers 13' and 14' is then removed from the mold cavity by upward movement of the plunger 24 (FIG. 5E), and such body is fired or sintered at a temperature in the range from approximately 1,100C to 1,200C to provide the previously described head 10 having its layer 13 of barium-ferrite and its layer 14 of zinc-ferrite. The head 10 is completed by lapping the surface 15 thereof to a smooth, cylinder-like finish for contact with the magnetic tape. Further, in a manner that is conventional, the head 10 is magnetized and, during such magnetization, the small coercive force of the zinc-ferrite constituting the layer 14 ensures that such layer will not be permanently magnetized, whereas the high magnetic coercive force of the barium-ferrite constituting the layer 13 ensures that the latter layer will be permanently magnetized in the manner previously described. Further, since both layers 13 and 14 are formed of ferrites, they will have approximately the same mechanical properties such as hardness, and therefore will uniformly resist wear as a result of the relative movement thereacross of the magnetic tape during the selective erasing of signals in a track or tracks of the tape.

Figure 5B:
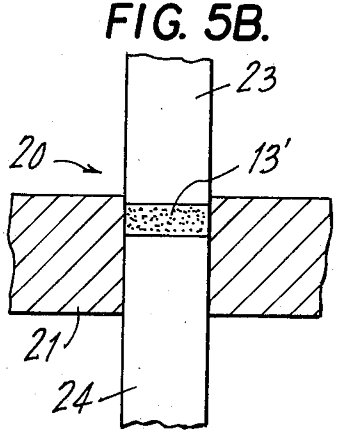
Figure 5C:
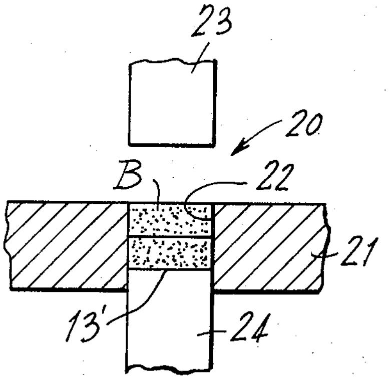
Figure 5D:
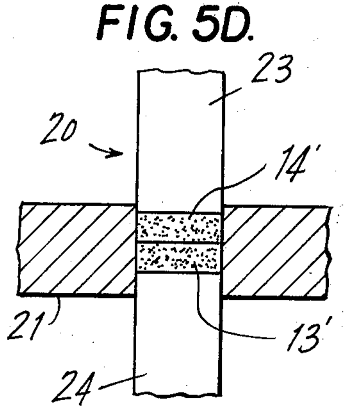
Figure 5E:
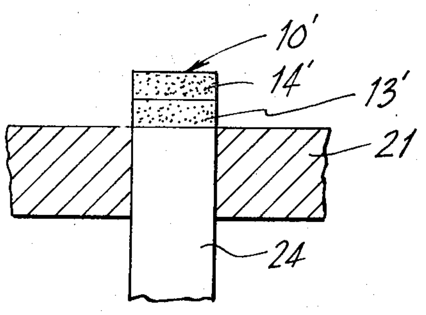

In the above described method of producing a head 10 according to this invention, the initial pressing of the layer 13' as illustrated in FIG. 5B, has been provided in order to positively avoid distortion or peeling away of the layer 13 from the layer 14 in the finished head 10 due to any difference in the coefficient of expansion of such layers. However, if the powders A and B employed for producing the layers 13 and 14 are composed of particulate materials of the same sizes, the initial pressing of the layer 13' can be omitted from the process. Further, if desired, the lower end surface of the plunger 23 which is used for the initial pressing of the layer 13' in FIG. 5B can be provided with a roughened surface so that the initially pressed layer 13' will have a similarly roughened upper surface for improving the bond between the layers 13' and 14'.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. The combination of a magnetic tape having a plurality of record tracks extending along said tape to receive recorded signals and each having a width that is substantially smaller than the width of said tape, and a magnetic erasing head having a contact surface that is at least as wide as said tape and is engageable with the latter during relative movement of said tape and head in the longitudinal direction of the tape, said head comprising a plurality of united ferrite layers superposed on each other and presenting continuous, monolithic exposed edge surfaces which combine to constitute said contact surface without interruptions in the latter, said exposed edge surfaces extending parallel to said direction of relative movement, half of said ferrite layers being permanently magnetized and having a width substantially equal to said width of each of the record tracks, the remainder of said ferrite layers being non-magnetic, each said permanently magnetized layer being aligned with one of said record tracks, in one position of the tape relative to said head, and with another of said record tracks when the tape is inverted, each said permanently magnetized layer presenting a series of alternately opposed poles at locations along said continuous, monolithic exposed surface thereof for erasing signals from the one of said record tracks which is then aligned with said magnetized layer in response to said relative movement of the tape and head.

2. The combination according to claim 1, in which each said non-magnetic layer is of a ferrite having a low magnetic coercive force and a high magnetic permeability for absorbing flux from an adjacent magnetized layer.

3. The combination according to claim 1, in which each said magnetized layer is of a ferrite selected from the group consisting of barium-ferrite and strontium-ferrite, and each said non-magnetic layer is of a ferrite selected from the group consisting of zinc-ferrite, manganese-ferrite, and manganese-zinc-ferrite.

4. The combination according to claim 1, in which said head has equal numbers of said magnetized and non-magnetic layers, respectively.

5. The combination according to claim 1, in which the strength of the magnetization of each said magnetized layer decreases progressively along said series of poles from a maximum at one end of said series.

* * * * *